Oct. 14, 1958 F. E. DE MOTTE 2,856,597

MATRIX TRANSLATOR

Filed July 26, 1956 2 Sheets-Sheet 1

INVENTOR
F. E. DE MOTTE
BY [signature]
ATTORNEY

Oct. 14, 1958 F. E. DE MOTTE 2,856,597

MATRIX TRANSLATOR

Filed July 26, 1956 2 Sheets-Sheet 2

INVENTOR
F. E. DE MOTTE
BY [signature]
ATTORNEY

United States Patent Office 2,856,597

Patented Oct. 14, 1958

2,856,597

MATRIX TRANSLATOR

Frank E. De Motte, New Vernon, N. J., assignor to Bell Telephone Laboratories, Incorporated, New York, N. Y., a corporation of New York Application July 26, 1956, Serial No. 600,245

10 Claims. (Cl. 340—347)

This invention pertains to code translation, and more particularly to the translation of numbers expressed in two-valued or binary codes.

Modern digital computers are predominantly of a type wherein calculations are carried out by assemblies of packaged operating units comprising bistate switching devices such as relays, magnetic cores, or transistor or vacuum tube trigger circuits. In one state the output current, voltage or impedance is low and in the other state it is high, a change of state being effected by an applied pulse. Since the device is only capable of actuating associated circuitry when in one of these states, it is then considered to be "on." When in the opposite state it is, consequently, considered to be "off." A more complete description of such devices and their utility in digital computers is given in the text "Faster Than Thought," edited by B. V. Bowden, Pitman and Sons, Ltd., 1953.

To permit relatively simple operation of complete operating units comprising bistate switching devices, resort is usually made to some form of binary digital code into which decimal numbers fed into the computer are first converted prior to performing arithmetic operations on them. The equivalent of a decimal number in "true" binary code consists of the sum of the largest integral powers of "two" which equals the decimal number. The presence or absence of any power, starting with $2_0$, is expressed by a succession of "0" and "1" digits wherein the positions of successive digits represent successively higher powers. The group of digits so obtained constitutes the binary number equivalent to the decimal number. For example, the decimal number 29 has the binary equivalent 11101, where the binary digits represent successively higher powers of two, referred to as in order of increasing significance, from right to left.

Another variety of binary code is called "two's complement" code. The two's complement of a binary number is obtained by subtracting it from two raised to a power at least equal to the number of places in the number. For example, in a binary computer wherein all numbers are represented in a maximum of four significant binary places, the two's complement of any binary number may be obtained by subtracting it from $2^4$, or 10000 in binary code. Thus if the decimal number seven is to be encoded, which is 0111 in true binary form, it is represented as the two's complement given by $$10000-0111=(0)1001$$

The zero in the fifth (most significant) position will not appear in the result since only four significant positions are retained by the computer.

By using a combination code wherein all positive numbers are in true binary code and all negative numbers in two's complement code, and adding an extra digit in the most significant place to identify the "sign," it is possible to express all quantities in positive form and to indicate whether they actually represent a positive or a negative value. Most commonly, a "0" in the most significant place indicates a positive value ond a "1" a negative value. In such a system, and assuming a five digit computer capacity, the number plus seven will appear as 00111. Minus seven will appear as the two's complement quantity 100000—00111=11001. The "1" in the most significant (fifth) place directly shows that this number is negative, and consequently that it is in two's complement form.

Besides the true binary and two's complement binary codes, a third type of complementary binary code which finds application in some digital computers is "one's complement" binary code. A one's complement binary number is derived from a true binary number by substituting a "1" for each "0" and a "0" for each "1." The one's complement of a number is one binary unit smaller than the true complement, and so is the same as the two's complement of the number one unit larger than that from which it was derived by such substitution. Using the decimal number seven to illustrate this, the true binary equivalent is 00111 and the equivalent one's complement is 11000. The two's complement of seven is 11001, and so is "one" greater than the one's complement. The two's complement of eight is 11000, and so is the same as the one's complement of seven.

In a binary digital computer, wherein all numbers are expressed in some type of binary code, each digit in a number is generally represented by one of two distinct levels of potential. Most commonly a "0" corresponds to ground potential and a "1" to a fixed positive potential above ground. However, in some cases a simplification of the computer circuitry is achieved by reversing these polarities. The "on" state of each bistate device in the computer can therefore represent either a "1" or a "0," depending on which of the foregoing relative polarities is utilized. For instance, suppose the characteristic of each device to be such that a positive potential turns it "on" and ground potential turns it "off." Then if a "1" corresponds to a positive level of potential, any bistate device which is "on" will represent the binary digit "1." However, if a "1" is represented by ground potential, any bistate device which is "on" will represent the binary digit "0." If the first mode of operation is considered to be in accordance with true binary code, then, evidently, this second mode of operation is in accordance with one's complement code.

A change from true binary to one's complement binary code translation may be required by other circumstances besides that wherein the relative polarities by which "1" and "0" binary digits are represented in the computer are interchanged. For example, suppose that even though a positive potential represents a "1" in the computer each bistable device is of a type which turns "off" in response to a positive potential. Then the state of each device will represent a digit in one's complement code. Other changes in the computer or associated circuitry may also affect the code in which output numbers appear, but the instant invention is concerned only with the resultant code rather than with the operating conditions which give rise to it. It is, therefore, adapted to use with many types of computers.

In order to display the results of the operations of a binary digital computer in intelligible form it is necessary to translate those results from binary form to their decimal equivalents. "Display" as used herein includes not only situations wherein a visual indication is to be produced, but also cases where development of control signals suitable for actuating other equipment is the objective, as in servo loops. Apparatus for performing such translation has, heretofore, not been readily adaptable to handling both positive and negative binary numbers which may be expressed in more than one code. If the mode of operation of the computer with which the decoder is to be used is fixed, of course, limited versatility of the translating means may be adequate. However, if the same translator is to be used with another computer wherein an alternative code is utilized, or if the code utilized by the same computer is altered, conventional translators will not operate properly without extensive modification. This shortcoming becomes even more severe when the computer supplies successive binary numbers which may be either in true or one's complement code, depending on their sign.

One type of translating apparatus which is widely used because of other advantages is the logic matrix. This comprises a circuit so constructed that for each possible binary input number a unique one of a plurality of output terminals is actuated. The output terminals represent the decimal equivalents of all possible input numbers, a particular output terminal being actuated only when the permutation of "1" and "0" digits in the input number applied to the matrix represents the binary number equivalent to the decimal value assigned to that terminal. In conventional matrices the digits in an input binary number control application of potentials which are all of the same polarity to each of a plurality of conductors connected to the output terminal having the decimal value equivalent to the input number. There is at least one conductor for each unselected output terminal which is not supplied with potential. Consequently, only at the proper output terminal is the net potential at the maximum possible level. By comparing the potentials of all terminals it is then possible to determine which one is fully actuated, thereby determining the decimal value of the number being translated.

Such matrix translators, in addition to their restricted versatility as described above, present the problem of providing a sufficient margin of potential difference between a selected output terminal and all unselected output terminals to assure trouble-free operation of voltage sensitive output devices connected to those terminals. When this margin is relatively small, such devices must be capable of becoming operative at a very precisely defined level of potential and remaining inoperative at potentials only slightly below that level. Unavoidable variations in the characteristics of supposedly identical devices, and in any one device over a period of time due to environmental factors, make such behavior extremely difficult to achieve and to maintain even if once achieved.

Accordingly, an object of the invention is to provide means for translating binary numbers expressed in any one of a variety of binary codes.

A further object is to provide a matrix translator having improved margins of distinction between selected and unselected translated values.

A further object is to provide means for translating successive binary numbers occurring at random in either of two binary codes.

A further object is to provide a binary to decimal translator adapted to be simply and conveniently adjusted to translate numbers expressed in any one of a variety of combinations of binary codes.

In one embodiment the invention comprises a matrix having a plurality of decimal display terminals connected through impedances to one voltage in each of a plurality of pairs of alternating voltages of which the voltages in each pair are in phase opposition. Each voltage applied to a given display terminal represents either the binary digit "1" or "0," depending on whether it is opposed to or in phase with a fixed phase reference voltage. A single auxiliary alternating current voltage is applied to those display terminals corresponding to decimal numbers having true binary code values which are the same as the one's complement binary values of any other decimal numerals which might be required to be translated. The phase of the auxiliary voltage is set to be either the same as or opposed to the phase of the reference voltage, depending on whether the number to be translated is in true binary code or in one's complement binary code. For either code, the display terminal corresponding to the decimal equivalent of any number to be decoded will be at a net alternating current potential at least forty percent greater than that of any other output terminal, so that the possibility of actuating an output device connected to any but the selected output terminal is eliminated or at least greatly minimized.

In another embodiment the invention comprises an arrangement generally similar to the foregoing, but wherein each display terminal is connected to its output device through switching means which connects it to either an output device corresponding to the same decimal number as that of the display terminal or the output device representing the next higher decimal number. The switching means is arranged to respond to the sign digit associated with each input number, thereby enabling the translator to display the decimal value of either true binary or two's complement binary numbers occurring in random order.

Other objects and features of the invention will be apparent from the following specification and accompanying drawings, in which.

Figure 1:
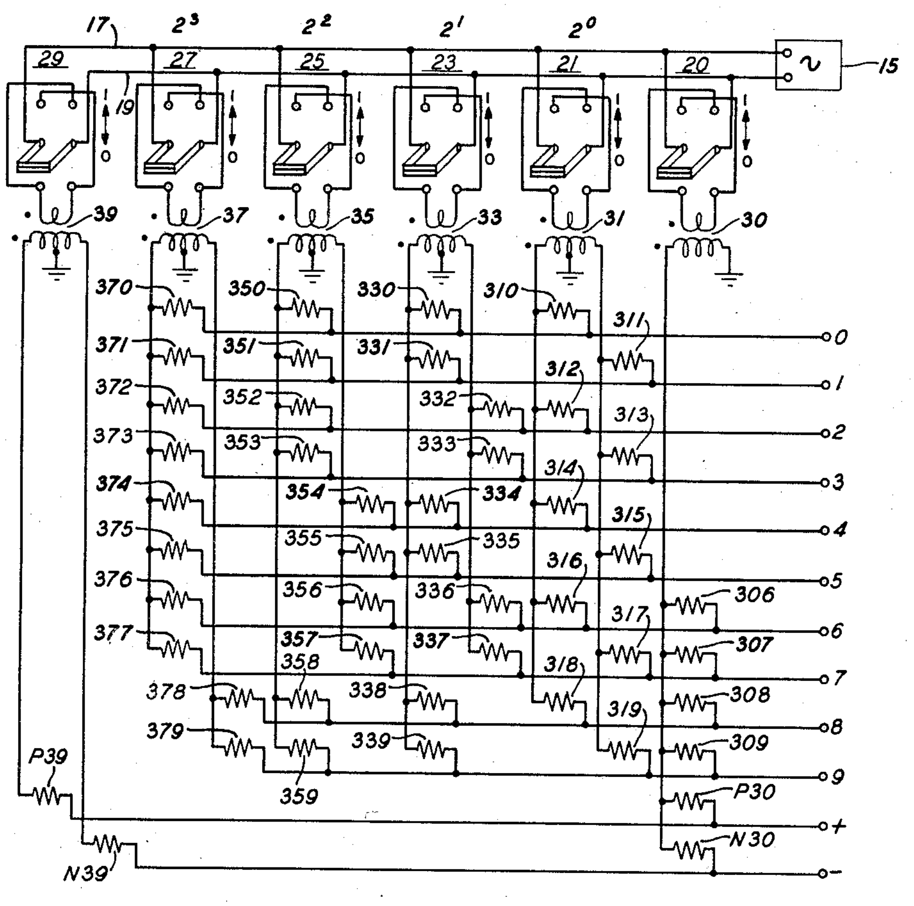
Fig. 1 is a circuit diagram of an embodiment of the invention suitable for translating both positive and negative binary numbers which are all in either true binary form or one's complement form, and is further adapted to translate binary numbers in a combination binary code wherein positive numbers are in true binary form and negative numbers are in one's complement form.

While the principles of the invention are applicable to the translation of binary numbers having any number of binary places, maximum utility and efficiency are achieved in translating binary numbers expressed in binary-coded decimal form. In this form the number consists of distinct groups of binary digits, each group representing one of the decimal digits of the equivalent decimal number. The binary code in which each such group is expressed may be any of those described, but since four binary digits suffice to represent any decimal digit (zero to nine), four binary digits are the maximum any such group can contain. As will be apparent from the ensuing description, this enables attainment of a higher margin of selection between terminals of the matrix circuit embodying the invention. The conversion of a binary number to binary-coded decimal form may be achieved by any of a variety of processes well known in the art and can be readily performed by virtually all binary digital computers. A number of these are desribed on pages 289 to 290 of the text "Arithmetic Operations in Digital Computers," by R. K. Richards, D. Van Nostrand Company, Inc., 1955.

Since four binary digits are required to express the maximum decimal digit 9, the translator of this invention is adapted to receive four significant binary digits. It is further adapted to receive a fifth digit indicative of the arithmetic sign of the number to be translated, so that negative as well as positive numbers can be handled. As stated previously, in true binary code the fifth digit is "0" if the incoming number is positive and is "1" if it is negative. The reverse is true in one's complement binary code. In cases where the computer provides a sign digit for each of the binary-coded decimal groups comprising a complete output number, each translator will respond to the sign digit of the number it translates. If the mode of operation of the computer should be such that the sign digit is associated only with the binary-coded decimal group corresponding to the most significant decimal digit in the number being translated, the translators of all groups may be interconnected so that each will receive the sign digit from the computer and operate in accordance with the code being used. These variations in the manner of interconnection of a plurality of translators to handle multi-digit decimal numbers will be obvious to those skilled in the art.

The invention will be described with reference to the translation of numbers expressed in any one of three types of binary code systems. In the interest of brevity of future reference, these code systems will hereinafter be identified as follows:

TYPE I

Every number, no matter whether it is positive or negative, is expressed in true binary code or every number is expressed in one's complement binary code. Which code applies is known in advance of the translating operation.

TYPE II

Positive numbers are expressed in true binary code and negative numbers in one's complement binary code. Numbers to be translated may be positive or negative at random.

TYPE III

Positive numbers are expressed in true binary code and negative numbers in two's complement binary code. Here again, positive and negative numbers may occur at random.

*Type I code system*

In Fig. 1 is shown a translator constructed in accordance with the invention and adapted to translate binary numbers expressed in the Type I code system. Switching means are provided whereby this circuit may be readily adapted to handle binary input numbers in either true binary or one's complement code.

A source 15 of phase reference alternating current is connected across a pair of conductors 17 and 19 which are connected to the primary windings of transformers 30, 31, 33, 35, 37, and 39 by way of double-pole double-throw reversing switches 20, 21, 23, 25, 27, and 29, respectively. The "down" position of any switch will be considered the "0" state, and the "up" position the "1" state. Although in Fig. 1 simple mechanical switches have been depicted, these are intended to represent any mechanical or electrical means capable of reversing the connections between the transformers and source 15 under the control of binary digits from a digital computer. If the computer expresses output numbers as permutations of the states of a plurality of bistate devices, which is the technique most used, each switch must be capable of being set to a state corresponding to that of individual ones of such bistate devices. Many types of circuits employing relays, magnetic cores, or transistor or electron tube trigegr circuits are known in the art which will perform this function.

Deferring temporarily the description of transformer 30 and its function, each of transformers 31 to 39 has a center-tapped secondary winding which is grounded at the tap and which may conveniently have more turns than the primary winding in order to obtain a degree of voltage amplification. All transformers 31 to 39 have the same turns ratio, so that the voltages across the secondary windings are all equal in magnitude and will be designated as $2e$. The magnitude of the voltage of either terminal of any secondary winding relative to ground is therefore $e$. The relative poralities of the voltages in the primary and secondary windings of each transformer are shown, as is conventional, by placing a dot adjacent the terminals at which the potential changes in the same sense.

Assume, for example, that switch 25 is operated to its "0" state. During the positive half cycles of source 15, designated herein as the half cycles during which conductor 17 is positive relative to conductor 19, the dotted terminal of the secondary winding of transformer 35 will be positive relative to ground and the undotted terminal will be negative. During negative half cycles of source 15 the dotted terminal of the secondary winding of transformer 35 will be negative relative to ground and the undotted terminal will be positive. In terms of the voltage of source 15 as a phase reference, it may be said that when switch 25 is in its "0" state the voltage of the dotted terminal of the secondary winding of transformer 35 is "in phase" with the reference voltage. Correspondingly, the voltage of the undotted terminal is "out of phase" or "phase opposed" to the reference voltage. If, however, switch 25 is operated to its "1" state, the potential at the dotted terminal of the secondary winding of transformer 25 will be negative relative to ground during positive half cycles of source 15. The reverse is true of the undotted terminal. With regard to the phase relations which then obtain, the voltage at the dotted terminal is phase opposed to the reference voltage while that at the undotted terminal is phase aiding. As is evident, the alternating voltages at corresponding secondary winding terminals of any two or more of transformers 31 to 39 will be in phase only when the switches connected to them are all in the same state. If two switches are in opposite states, the corresponding secondary winding terminals (i. e., both dotted or both undotted) of the transformers connected to the switches will be at voltages of opposite phase. In such case, the voltage at the dotted secondary terminal of one of those transformers will be in phase with that at the undotted secondary terminal of the other.

The secondary winding terminals of transformers 31 through 37 are connected in a matrix arrangement to decimal display terminals 0 through 9, the matrix being formed by the connection of each display terminal to one terminal of each transformer secondary through a connecting impedance. Each of these impedances is identified by a three-digit reference numeral of which the first two digits are the reference numeral of the transformer to which it is connected and the last digit is the same as that of the display terminal which it connects to a terminal of that transformer. For example, the impedance connecting the secondary winding of transformer 37 to display terminal 5 is therefore denoted as impedance 375.

In the matrix arrangement, the secondary winding of transformer 39 is connected at its dotted terminal through an impedance P39 to a positive sign display terminal (+), and at its undotted terminal through an impedance N39 to a negative sign display terminal (−). The dotted terminal of the secondary winding of transformer 37 is connected to display terminals 0 through 7. The dotted terminal of the secondary winding of transformer 35 is connected to display terminals 0 through 3, 8 and 9. The dotted terminal of the secondary winding of transformer 33 is connected to display terminals 0, 1, 4, 5, 8, and 9. The dotted terminal of the secondary winding of transformer 31 is connected to display terminals 0, 2, 4, 6, and 8. The undotted terminal of the secondary winding of each of these transformers is connected to those of display terminals 0 through 9 to which its dotted terminal is not connected. In each case the described connection includes, in series, one of the impedance elements 310 through 379.

Transformer 30, the description of which was deferred as stated above, has its secondary winding grounded at the undotted terminal. The dotted secondary terminal is connected to display terminals 6 through 9 via impedances 306 through 309 respectively, using the same system of impedance designation as that used for transformers 31 through 35. The dotted terminal is further connected to positive and negative sign display terminals (+) and (−) through respective impedances P30 and N30. Transformer 30 has a turns ratio such that the voltage across the secondary winding is $e$, the same as the voltage to ground at the secondary of each of transformers 31 through 39. Switch 20 and transformer 30 comprise the means whereby the matrix may be adapted to translate either true binary or one's complement binary numbers. For the Type I code system described above, it is known which of these alternatives is to be used. Switch 20 is set to the "0" state for numbers in true binary code and to the "1" state for binary numbers in one's complement code.

The matrix in Fig. 1 is arranged for proper operation when the states of switches 21 through 27 are set to respectively represent the successive digits of an incoming binary number in order of increasing significance. That is, the setting of switch 21 represents the $2^0$ digit, the setting of switch 23 represents the $2^1$ digit, that of switch 25 the $2^2$ digit, and that of switch 27 the $2^3$ digit. The setting of switch 29 represents the sign digit of an incoming number, as will be explained in more detail hereinafter. It is evident that by interchanging the connections of the secondaries of transformers 31 through 39 any of switches 21 to 29 could be made to represent any desired digit in the number to be translated.

Each of display terminals 0 to 9, when selected, indicates that the binary number to be translated has a decimal value the same as the number of that terminal. It will be explained hereinafter that the potential of a display terminal which is "selected" is approximately equal to $e$, which is the voltage to ground of the secondary winding terminal of each of the transformers, while the highest potential at any other display terminal is only $0.6e$. To clearly distinguish the selected terminal, output devices connected to the display terminals should have a threshold operating voltage E such that $e>E>0.6e$. For example, a visual display of the decimal value of each number translated could be obtained by connecting a gas discharge lamp, such as a neon glow lamp, to each display terminal. Gas discharge lamps have a rather well-defined threshold voltage level, and so are suited to this application. An opaque glass overlay may be mounted adjacent all the lamps with a transparent area in the shape of a decimal digit opposite each one, the digit in each case being the same as that of the display terminal to which the lamp is connected. Since only the lamp connected to the selected terminal glows, the decimal equivalent of the input binary number will be depicted. Alternatively, each lamp, or an illuminated element therein, may be shaped in the form of the decimal numeral of the terminal to which the lamp is connected, in which case the glass overlay would not be required.

The impedances connected to any one of the display terminals of Fig. 1 are equal, and may conveniently be resistors so as to have virtually the same values regardless of the frequency of source 15. Invariance of impedance relative to frequency is not, however, essential to the circuit operation. Consequently, inductances may be utilized instead, and would reduce the power dissipation in the matrix. The impedances connected to all display terminals may also be equal in value, but a factor bearing on this is that for equal loads connected to all the display terminals, as where the same type glow lamps are used, it is preferable for the matrix to present the same output impedance at each terminal. If only the four transformers 31 through 37 were connected to all display terminals, at each display terminal the output impedance would be one-fourth the impedance in each connecting path. All connecting impedances in the matrix could then be equal. However, since display terminals 6 through 9 are connected to the auxiliary fifth transformer 30, and since all the impedances connected to these display terminals are equal, the output impedance at each of these display terminals will only be one-fifth of the impedance in each connection of these terminals. To equalize the output impedances, each connecting impedance to terminals 6 through 9 should be 5/4 or twenty-five percent greater than each of the connecting impedances to terminals 0 through 5. Similarly, since the sign display output terminals (+) and (−) are each connected to only two transformers, the connecting impedances for those terminals should be half that for each of display terminals 0 to 5.

Figure 2:
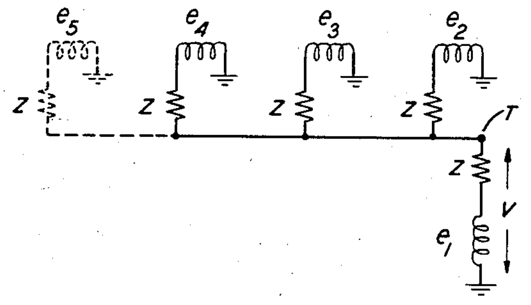
Fig. 2 is a simplified diagram of the circuilt connected to each of the display terminals in Fig. 1.

One of the characteristics of the circuit of Fig. 1 which constitutes a feature of the invention may be more readily understood by reference to Fig. 2. This represents the conditions existing at any one of the display terminals of Fig. 1. The display terminal may be considered to be located at point T, and is at a potential V with respect to ground. Connected in parallel and to terminal T are four voltage sources $e_1$ through $e_4$, each in series with an impedance designated as Z in each case, since all of these impedances are equal. The other terminal of each voltage source is grounded. If the magnitude of the voltage produced by each of these sources is denoted by $e$, but it is supposed that this voltage may be positive or negative relative to ground, the circuit directly corresponds to the conditions at any one of display terminals 0 through 5 in the circuit of Fig. 1. In that circuit a fifth transformer 20 is connected to each of display terminals 6 through 9, so in Fig. 2 a fifth voltage source $e_5$ is shown connected to point T through an impedance Z. These fifth elements are shown in dotted form since they are not connected to terminals 0 through 5 of Fig. 1. Considering only voltage sources $e_1$ through $e_4$, the requirement that the sum of the currents flowing toward terminal T be zero gives:

$$\frac{e_1-V}{Z}+\frac{e_2-V}{Z}+\frac{e_3-V}{Z}+\frac{e_4-V}{Z}=0$$

or $$V=\frac{e_1+e_2+e_3+e_4}{4} \quad (1)$$

Following the same procedure, if source $e_5$ is included the result obtained is $$V=\frac{e_1+e_2+e_3+e_4+e_5}{5} \quad (2)$$

Consequently, the voltage at any display terminal will be the average of the transformer voltages applied to that terminal. In addition, if all the applied transformer voltages have the same sign, as when they are all in phase, the voltage at the display terminal will be at its maximum value $e$. Now suppose that one of the applied voltages is opposite in sign from the others, being in phase opposition to them. This would be the case in Fig. 1 for a display terminal corresponding to a binary number of which one digit differs from the digits in the binary equivalent of the decimal number of the selected terminal. The voltage at such a terminal will be only $$V=\frac{-e_1+e_2+e_3+e_4}{4}=\frac{e}{2} \quad (3)$$

The foregoing is the result for four voltage sources. If five sources are included the voltage at such a one digit disagreement terminal would be $\frac{3}{5}e$. It is evident that if more than one of sources $e_1$ through $e_5$ should be opposite in sign from the others the voltage at terminal T would be even smaller than in the case of a one digit disagreement as described. Consequently, the difference in voltage levels between a selected display terminal and any unselected display terminal in the circuit of Fig. 1 is $0.5e$ for terminals 0 through 5 and $0.4e$ for terminals 6 through 9. In prior art matrix decoders selection of a particular display terminal has been accomplished by the removal, rather than the reversal, of the potential at at least one of the connections to each unselected terminal. With four connections to each display terminal, an unselected terminal corresponding to a one digit disagreement with the selected terminal would be at a potential of $\frac{3}{4}e$. For five connections the potential would be $\frac{4}{5}e$. The voltage difference between a selected and an unselected display terminal is then only 0.25$e$ for four connections and 0.2$e$ for five connections. This comparison shows that the described mode of "driving down" the voltage applied to an unselected display terminal, in accordance with the invention, doubles the voltage margin formerly obtained between a selected and any unselected terminal.

Since the matrix of Fig. 1 provides a minimum voltage margin between a selected and any unselected display terminal of forty percent of the transformer secondary terminal voltage to ground, it is a simple matter to set the voltage of source 15 so the potential obtained at unselected display terminals lies below the threshold level of any output devices connected to them while the potential at a selected display terminal exceeds that threshold level. The voltage of source 15 should be as small as possible consistent with these requirements, since the larger it is the greater will be the power loss in the matrix impedances due to circulating currents between transformer terminals of opposing polarities. Increasing the connecting impedances in the matrix will reduce such circulating currents, so that it is advisable to make these impedances as large as possible. The limit is set by the minimum current required by the loads connected to the display terminals, the load currents being reduced as the matrix impedances are increased. For neon glow lamps, for example, a minimum current is required to cause such lamps to fire and to subsequently remain illuminated. Typical values of the connecting impedances in a matrix wherein the display terminals are connected to neon glow lamps are 68,000 ohms for those connected to display terminals having four transformer connections and 85,000 ohms for those connected to display terminals having five transformer connections. These values establish the matrix output impedance at each display terminal at 17,000 ohms. A typical value of the voltage of source 15 in such a matrix is 115 volts, with the transformers having a step-up voltage ratio of 1.5.

Returning now to Fig. 1, the circuit operation will be made evident by a specific example. Assume that the number 0101 (5 in true binary code) is to be translated. The sign will be ignored at this point since a detailed description of sign indication is given below. This number is represented in the circuit by setting switch 21 to "1," switch 23 to "0," switch 25 to "1" and switch 27 to "0." During the positive half cycles of source 15 the transformer secondary terminals which will be positive are the dotted terminals of transformers 33 and 37 and the undotted terminals of transformers 31 and 35. Examining the connections to these transformer terminals, it will be seen that only display terminal 5 is connected to all of them. Consequently it is at a potential $e$ and will be the selected terminal. As explained above, the maximum possible potential at any other display terminal will exist at those terminals whose decimal numerals are represented by binary numbers differing by only one digit from the binary number 0101, and will be only $$\frac{e}{2}$$

For example, the binary number 0100 represents the decimal 4 and differs from 0101 in that its first digit is a "0" rather than a "1." Considering display terminal 4, it is connected to the positive terminals of transformers 37, 35, and 33, but to the negative terminal of transformer 31. Its potential is therefore $$\frac{e}{2}$$

A similar situation exists in the case of display terminals corresponding to binary numbers disagreeing in three digits from the input binary number, except that the sign of the net potential of such terminals will be negative. An example of this is display terminal 2, which corresponds to the binary number 0010. The first three digits disagree with those of 0101. This display terminal is connected to the positive terminal of transformer 37 but to the negative terminals of transformers 35, 33, and 31, so that it is at a potential of $$\frac{e}{2}$$

It is not, therefore, selected.

Display terminals having decimal values represented by binary numbers differing in all four significant digits from the binary number being decoded pose a special problem. This is because it is the magnitude of the voltage at the display terminals which determines which terminal is selected, regardless of the phase of that voltage relative to the phase reference voltage of source 15. In fact, this is the reason that the matrix operation is identical on positive and negative half cycles of source 15, the reversal of the polarities of all potentials yielding voltages of the same magnitudes in both half cycles. The only effect of the alternation of the polarity of source 15 is to produce 180 degrees phase shift in the display terminal voltages in alternate half cycles. Since a 180 degree phase shift is also produced by switching any bistate device from the "0" to the "1" state, the potential at a display terminal corresponding to a four digit disagreement with any other display terminal is the same during negative half cycles as the potential at the other terminals during positive half cycles. This fact makes it clear that rectifying devices of the kind used in conventional matrices would not be able to discriminate between such terminals.

To illustrate the problem under discussion, and still considering the translating of the binary equivalent of decimal 5, or 0101, the binary number corresponding to a four digit disagreement is 1010 and corresponds to the decimal value 10. Since no display terminal has this decimal value, on positive half cycles of source 15 no display terminal is connected to all negative transformer terminals and so no display terminal other than that for the decimal value 5 will be selected. The same is true for binary numbers corresponding to any of the decimal values 0 to 5, as shown in the following Table 1:

TABLE 1

| Decimal | True Binary Code | One's complement Binary Code |
|---|---|---|
| 0 | 0000 | 1111 |
| 1 | 0001 | 1110 |
| 2 | 0010 | 1101 |
| 3 | 0011 | 1100 |
| 4 | 0100 | 1011 |
| 5 | 0101 | 1010 |
| 6 | 0110 | 1001 |
| 7 | 0111 | 1000 |
| 8 | 1000 | 0111 |
| 9 | 1001 | 0110 |

In Table 1 the binary numbers which disagree in all four digits from any possible input binary number are shown in the column headed "One's complement Binary Code," since a four digit disagreement with any binary number constitutes the one's complement of that number. It is seen that for decimals 0 to 5 the true binary code equivalents have one's complements which are not the same as any of the true binary equivalents of decimals 0 to 9. As a result, when any of the binary equivalents of decimals 0 to 5 are translated no problem of possible selection of more than one display terminal arises. However, in the case of decimal numbers 6 and 9 each has a true binary code equivalent which is the same as the one's complement representation of the other. The same situation exists in the case of decimals 7 and 8. In the absence of any provision to prevent it, for each of these pairs of numbers both display terminals would be selected when either number of the pair is translated. It is the presence of switch 20, transformer 30, and impedance elements 306 through 309 connected as described to display terminals 6 through 9 which prevents this erroneous selection from occurring, as will now be described.

Assume that all input numbers are in true binary code. Switch 20 will then be set to its "0" state and so the voltage at the dotted terminal of the secondary winding of transformer 30 will be in phase with the reference voltage of source 15. Now if the true binary number 0110, corresponding to the decimal value 6, is to be translated, during positive half cycles of source 15 the dotted terminals of transformers 31 and 37 and the undotted terminals of transformers 33 and 35 are all positive. That is, the voltages at these terminals are all in phase with each other and with the reference voltage. These are the transformer terminals to which display terminal 6 is connected, and since this display terminal is also connected to the dotted terminal of the secondary of transformer 30, all connections to it are in phase and it will be selected. That is, its potential will be equal to $e$. Now examine display terminal 9, which corresponds to the true binary number 1001. This is also the one's complement of 6, so it is connected to the alternate secondary terminals of transformers 31 through 37 and receives four voltages which are all in phase with each other but phase opposed to the reference voltage. Since display terminal 9 is also connected to the dotted terminal of the secondary of transformer 20, which is in phase with the reference voltage, there is a total of four negative and one positive transformer connection. From Equation 2 above, it follows that the potential of display terminal 9 will be only $\frac{3}{5}e$, and so is insufficient to qualify as a "selected" terminal as defined above. On the other hand, when the true binary equivalent of decimal 9 is to be translated, the situation will be reversed and display terminal 6 will now be at a potential of only $\frac{3}{5}e$ when display terminal 9 is at a potential of $e$. Consequently the ambiguity between terminals 6 and 9 is avoided and only the proper one is selected. This same analysis applies as between terminals 7 and 8.

The foregoing explanation of the manner in which ambiguities between any of terminals 6 through 9 are prevented may be conveniently summarized by taking the view that transformer 30 serves to add an extra "0" digit to each of the true binary equivalents of these decimal numbers in the most significant place ($2^4$). Thus, the circuit of Fig. 1 actually "sees" the true binary equivalent of decimal number 6 as 00110, the equivalent of decimal 7 as 00111, 8 as 01000, and 9 as 01001. The one's complement of each of these true binary numbers has an extra "1" digit in the most significant place. Since the extra digit of the true binaries is a "0" in each case, no confusion with any of the one's complements is possible. It is to be noted that if complete circuit uniformity should be desired, display terminals 0 through 5 could also be connected to the dotted terminal of transformer 20 in the same way as display terminals 6 to 9. That is, the true binary code equivalents of each of these numbers may also be stated in five significant places by adding a "0" digit in the extra fifth place. This was not done in the circuit of Fig. 1 because the presence of the fifth digit reduces the voltage margin between a selected and unselected display terminal from $0.5e$ to $0.4e$, as pointed out above in the analysis of Fig. 2.

Now suppose that the circuit of Fig. 1 is to be utilized for translating binary numbers expressed in one's complement binary code. The only change necessary to adapt the circuit for this operating condition is to set switch 20 to its "1" state instead of the "0" state. The selection of any of display terminals 0 through 5 is unaffected by this change, the only difference in their operation being that where formerly the voltage at a selected one of them was in phase with the reference voltage of source 15 it will now be phase opposed to the reference voltage. This is evident from Table 1, together with the fact that in successive half cycles of source 15 the voltage at the terminals of each of transformers 30 and 37 is reversed. When an input number in true binary code is applied to the circuit, during negative half cycles of source 15 the permutation of voltages at the secondary winding terminals of these transformers is the same as it would be during positive half cycles of source 15 if the input number had been the one's complement of the input number actually applied. With regard to terminals 6 through 9, the extra digit which transformer 30 provides for input one's complement equivalents of each of these decimal values is now a "1" rather than a "0". The one's complement equivalent of 6 is therefore seen by the matrix as 11001, 7 is seen as 11000, 8 as 10111 and 9 as 10110. None of these numbers are the same as a four bit disagreement with any other of them, so that again there is no possibility of any of the terminals 6 through 9 being simultaneously selected.

The function of switch 29 and transformer 39 is to indicate the sign of the number being translated. If all numbers are in true binary code, the sign of each may be indicated by a sign digit which is "0" if the number is positive and "1" if it is negative. The magnitude of the number remains the same in both cases, however, so that the sign digit is not arithmetically part of the number in the same sense as it is when negative numbers are expressed in complement form. If all numbers are in one's complement code, the sign digit will, correspondingly, be "1" if the number is positive and "0" if it is negative. Switch 29 is controlled by the sign digit to be in its "0" state if that digit is "0" and in its "1" state if that digit is "1."

First suppose that all input numbers are in true binary code, switch 20 therefore being set to its "0" state. Then the potentials applied to both of sign display terminals (+) and (−) by transformer 30 are in phase with the reference voltage of source 15. If the input number is positive, its "0" sign digit will set switch 29 to its "0" state. Then the voltage at the dotted terminal of transformer 39 will be in phase with the reference voltage and the undotted terminal will be phase opposed. Sign display terminal (+) will be at a voltage of $$\frac{e+e}{2}=e$$

and is selected, while the voltage of display terminal (−) is zero since the transformer voltages applied to it are in phase opposition. In the event the input number is negative its sign digit will be a "1" and so will cause switch 29 to be set to its "1" state. The relative phases of the voltages at the terminals of the secondary winding of transformer 29 are now reversed, and consequently terminal (−) is now the one which will be selected.

If all input numbers are to be in one's complement binary code, switch 20 is set to its "1" state. Now both potentials applied to sign display terminal (+) are in phase when switch 29 is set to its "1" state, which is the case when the input number is positive. The potentials applied to sign display terminal (−) will be in phase when switch 17 is set to its "0" state, which will be the case when the input number is negative. The correct sign display terminal is, therefore, always selected.

*Type II code system*

The translation of numbers expressed in the Type II code system, wherein all positive numbers are expressed in true binary code and all negative numbers in one's complement code, will now be considered. The circuit of Fig. 1 is suited to this application if two slight changes in its mode of operation are made. One of these concerns switch 29, which is to be set permanently in its "0" state. The other concerns switch 20, which is to be set in accordance with the sign digit of any number to be decoded. That is, it will be in the "0" state for a "0" sign digit and in the "1" state for a "1" sign digit. These modifications are made because in the Type II code the sign digit of any number is arithmetically part of the number, and is the most significant (fifth) digit. It is "0" for a positive number and "1" for a negative number, no matter whether the number is in true binary or one's complement code.

Suppose a positive input number is to be translated. Since it has a "0" sign digit, switch 20 will be set to its "0" state. The circuit then operates the same as in Fig. 1 when all numbers are in true binary code. Since positive numbers in the Type II code combination are all in true binary form, this mode of operation is correct. If a negative input number is to be translated, its "1" sign digit will result in switch 20 being set to its "1" state. The circuit operation is then the same as that of Fig. 1 when all numbers are in one's complement binary code. Since negative numbers in the Type II code combination are all in one's complement code, the circuit operation is again correct. With regard to sign display, when switch 20 is set to its "0" state, the phases of the voltages at the dotted secondary terminals of transformers 30 and 39 will be the same. When switch 20 is set to its "1" state, the undotted ones of these terminals will be at voltages which are in phase. As a result the (+) terminal is selected for positive input numbers and the (−) terminal is selected for negative input numbers.

*Type III code system*

Figure 3:
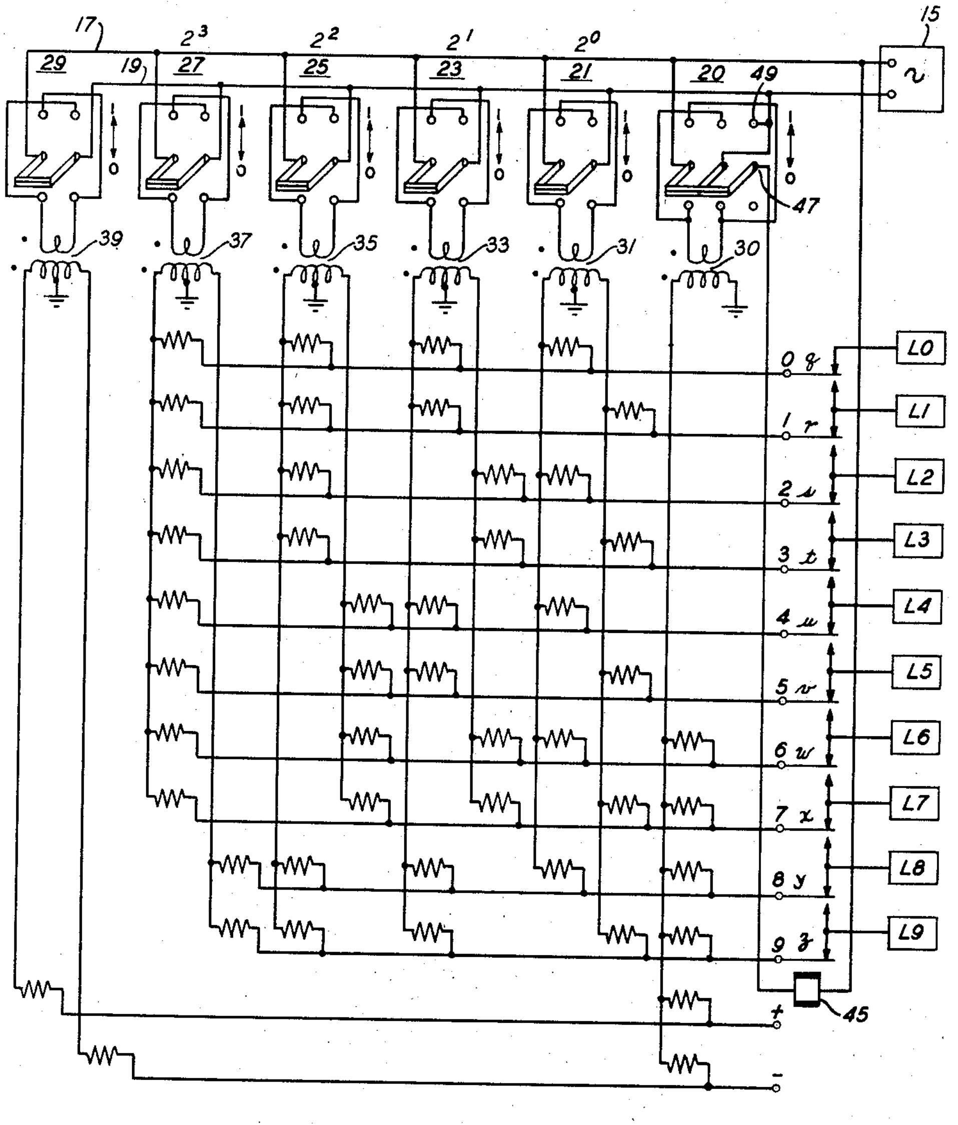
Fig. 3 is a circuit diagram of an embodiment of the invention adapted to translate binary numbers in a combination code wherein positive numbers are in true binary form and negative numbers are in two's complement form.

Fig. 3 is a circuit diagram of an embodiment of the invention adapted for translating numbers expressed in the Type III code system, wherein all positive numbers are in true binary code and all negative numbers are in two's complement code. The circuit is the same as that of Fig. 1 as described for translating numbers in the Type II code system, but additionally includes means for connecting each of display terminals 0 to 8 to the next higher numbered terminals of a bank of decimal output devices L0 to L9 when the input number is negative. The output devices may be neon glow lamps of the type described above, or equivalently may be any suitable utilization device having a threshold voltage level E such that $e>E>0.6E$. Two position contactors $q$ through $z$ are respectively connected to display terminals 0 through 9. Each contactor is disposed between two fixed contacts, and is normally in conducting relation with only the upper one. Each upper fixed contact is connected to the output device having the same decimal numeral as that of the display terminal to which the associated contactor is connected. All contactors are "ganged," so that all are in conducting relation with their upper contacts or all are in conducting relation with their lower contacts at any time. Each lower contact is connected to the output device having a decimal numeral which is one greater than that of the display terminal to which that contact's associated contactor is connected. Conveniently, contactors $q$ through $z$ may be the armatures, and the associated fixed contacts the contact structure, of a relay having an actuating winding 45. When winding 45 is not energized, the contactors or armatures are in conducting relationship with the corresponding upper contacts. Relay winding 45 is arranged to be energized only if the number to be decoded is negative.

As described with reference to the circuit of Fig. 1 as adapted for translating numbers in the Type II code system, switch 20 is responsive to the sign digit of the number to be translated. Consequently, it is set to the "1" state when that digit signifies that the number is negative. A convenient arrangement for operating winding 45 is, therefore, to utilize switch 20 to close a series path from source 15 through winding 45 when switch 20 is in the "1" state, but to break this path when in the "0" state. One such arrangement, as shown in Fig. 3, is to provide switch 20 with two additional terminals 47 and 49 which are connected to each other when the switch is in its "1" state but are disconnected when the switch is in its "0" state. If switch 20 is actually a two-state electronic trigger circuit, the extra terminals might correspond to the input and output terminals of an electronic gate which is rendered conductive when the trigger circuit is in the "1" state. Such adaptations of electronic circuitry to perform the indicated functions of switch 20 will be evident to those skilled in the switching and computing arts. Similarly, each of the contactors $q$ through $z$ and their associated contacts may equivalently represent a pair of electronic gating circuits connected to the display terminal and adapted so that one or the other is conductive depending whether a master gating circuit connected to both is or is not actuated by switch 20. It is therefore clear that while a typical relay circuit is shown in Fig. 3, it is the switching characteristic of that circuit which is requisite to this embodment of the invention rather than the specific illustrative devices described.

In the operation of the circuit of Fig. 3, when a positive input number is to be translated, switch 20 will be in its "0" state. Relay winding 45 will not be energized, and contactors $q$ through $z$ will be in conducting relation with their upper contacts. Each of display terminals 0 through 9 are then connected to the correspondingly numbered ones of output devices L0 through L9. The circuit therefore operates in the same manner as that of Fig. 1 when positive binary numbers are to be translated. When a negative binary number is to be translated, switch 20 will be in its "1" state, and so energizes relay winding 45. Contactors $q$ through $z$ will then be in conducting relation with their lower contacts, connecting display terminals 0 through 8 to output devices L1 though L9, respectively, and disconnecting display terminal 9 entirely. The result will be apparent from the numerical relationships shown in the following Table 2:

TABLE 2

| Two's Complement Binary Code | One's Complement Binary Code | Decimal | True Binary Code |
|---|---|---|---|
| 0000 | 1111 | 0 | 0000 |
| 1111 | 1110 | 1 | 0001 |
| 1110 | 1101 | 2 | 0010 |
| 1101 | 1100 | 3 | 0011 |
| 1100 | 1011 | 4 | 0100 |
| 1011 | 1010 | 5 | 0101 |
| 1010 | 1001 | 6 | 0110 |
| 1001 | 1000 | 7 | 0111 |
| 1000 | 0111 | 8 | 1000 |
| 0111 | 0110 | 9 | 1001 |

Table 2 shows that the two's complement equivalent of each of decimal numbers 0 through 9 is identical with the one's complement equivalent of the decimal number one unit smaller. Consequently, when a two's complement input number is translated the matrix operation will be the same as in Fig. 1 but the display terminal which is actuated will correspond to a decimal number one unit smaller than the correct decimal value.

However, since the display terminals are connected to the next higher numbered output devices, the correct output device will be actuated. For example, suppose the two's complement number 1011 is applied to the translator. The translator will react to this as if the one's complement of decimal number 4 had been applied and so will actuate display terminal 4. Since that display terminal is connected to output device 5, that is the output device that will be operated. Referring to Table 2, it is seen that the two's complement binary number 1011 represents the decimal number 5, so that the result achieved is correct.

When a two's complement number is to be translated, the circuit involving contactor *z* connected to display terminal 9 and its associated fixed contact is broken. Since no lower contact is provided, contactor *z* and display terminal 9 are not connected to any output device. The reason for this arrangement is that the one's complement of decimal number 9 is the same as the two's complement of decimal number 10, which can never appear as an input number. Consequently, no two's complement binary number which is ever applied to the translator will require actuation of display terminal 9. It should further be noted that the decimal number zero is the same in both true binary and true complement code. Since the sign digit is "0," the translator will treat it as a positive number in both cases. Therefore output device L0 can only be required to be connected to display terminal "0" in any possible case. For this reason, in Fig. 3 that device can only be either disconnected entirely or connected to display terminal "0."

Many alternative arrangements may be devised in accordance with the principles set forth in connection with the circuit of Fig. 3. For example, when a visual output display is provided by using neon glow lamps to illuminate a glass overlay, as suggested above, relay winding 45 could be used to operate spring means to shift the glass so that the digits printed thereon are adjacent the next lower numbered lamps. Each lamp could then be allowed to be permanently connected to each of the display terminals 0 through 9.

It is also apparent that a single translator suitable for handling both the Type II and Type III code systems may be constructed by adding to the circuit of Fig. 3 a manual switch in series with operating winding 45 for closing or opening its operating circuit. When the switch is open the matrix will be adapted to handle the Type II code system; while when closed the matrix will handle a Type III code system. A circuit of this type could be further extended to handle the Type I code combination by providing means by which the sign digit of an incoming number may control either switch 20 or switch 29. Modifications of these and other types will be evident to those skilled in the switching and computing arts in view of the teachings of the invention as set forth in this specification and drawings.

What is claimed is:

1. A matrix translator for numbers expressed in any of a plurality of binary digital codes having the same number of digits, comprising means for generating a plurality of pairs of number-selecting voltages of which the voltages in each pair cyclically alternate in phase-opposed relation, switching means connected to said generating means for establishing the relative phases of the voltages in successive ones of said pairs of number-selecting voltages in correspondence with the digits of any of said numbers, a plurality of display terminals, means for connecting said display terminals to said generating means to apply to each of said terminals one of the voltages from each of a number of said pairs of number-selecting voltages equal to the number of digits in said codes, means for producing a cyclically alternating code-selecting voltage the phase of which relative to said number-selecting voltages corresponds to any of said codes, and means for connecting said last-named means to selected ones of said display terminals, each such selected terminal being one at which when all number-selecting voltages applied thereto are in phase, all number-selecting voltages applied to an additional one of said selected terminals will also be in phase.

2. A matrix translator for deriving the decimal equivalents of numbers expressed in any of a variety of binary digital codes having the same number of digits, comprising a plurality of voltage-transferring means each having a pair of output terminals, a source of phase reference alternating voltage, a plurality of multi-state switching means for connecting said source with each of said voltage-transferring means and adapted to be respectively set in states corresponding to the digits of any of said numbers, each of said voltage-transferring means being adapted to produce a pair of phase-opposed number-selecting voltages at its output terminals which alternate in synchronism with said phase reference alternating voltage, a plurality of display terminals, impedance means for connecting each of said display terminals with one of the output terminals of each of said voltage-transferring means, additional voltage-transferring means, additional multi-state switching means for connecting said source with said additional voltage-transferring means and adapted to be set in a state corresponding to any of said codes, and additional impedance means for connecting selected ones of said display terminals to said additional voltage-transferring means, whereby only one of said display terminals at a time may be subjected to alternating voltages which are all in the same phase.

3. A matrix translator for deriving the equivalents in an output code of input numbers each of which is expressed in an input binary code having a fixed number of significant digits plus a code identification digit, comprising first means for producing a plurality of pairs of phase-opposed number-selecting alternating voltages, switching means connected to said first means and adapted to establish the relative phases of the number-selecting voltages in respective pairs in correspondence with the binary values of the respective significant digits of any of said input numbers, second means for producing a code-selecting alternating voltage, second switching means connected to said second means and adapted to establish the phase of said code-selecting voltage in correspondence with the binary value of the code identification digit of any of said input numbers, a plurality of display terminals, and impedance means for so connecting each of said display terminals to said first and second means that all voltages applied to any one of said display terminals are all in the same phase for only one of said input numbers.

4. A matrix translator for deriving the decimal values of input numbers which may be expressed in various binary digital codes having the same number of significant digits, comprising a source of phase reference alternating voltage, a plurality of first switching means connected to said source, respective ones of said first switching means being adapted to be set in either of two states respectively corresponding to the binary values of the respective significant digits of each of said input numbers, a plurality of first voltage-transferring means respectively connected to said plurality of first switching means, each such first voltage-transferring means being adapted to produce a pair of phase-opposed number-selecting alternating output voltages of which the first voltage in the pair is in phase with said reference voltage when the associated one of said first switching means is in its first state and the second voltage in the pair is in phase with said reference voltage when the same switching means is in its second state, second switching means connected to said source and adapted to be set in either of two states dependent on the type of digital code in which said input numbers are expressed, second voltage-transferring means connected to said second switching means and adapted to produce a code-selecting alternating output voltage the phase of which relative to said reference voltage corresponds to the state of said second switching means, a plurality of display terminals, a plurality of first impedance means for so connecting said display terminals to said first voltage-transferring means that all number-selecting voltages applied to any one display terminal are all in the same phase for one of said input numbers, and second impedance means for connecting said second voltage-transferring means to those of said display terminals to which are applied number-selecting voltages which are all in the same phase for more than one of said input numbers.

5. A matrix translator for deriving the decimal value of any number in a group of binary numbers which are all expressed in either of two binary codes having a fixed number of digits, comprising a plurality of bistate devices the states of successive ones of which represent the binary values of successive digits in said codes, means for applying a phase reference alternating voltage to all of said devices, a plurality of voltage-transferring means respectively connected to said devices, each such voltage-transferring means being adapted to produce a pair of phase-opposed number-selecting alternating voltages of which the first voltage in each pair is in phase with said reference voltage when the associated one of said devices is in its first state and the second voltage in each pair is in phase with said reference voltage when the same device is in its second state, a plurality of display terminals respectively corresponding to the decimal values of all numbers in said group, a plurality of impedances for connecting said display terminals to said voltage-transferring means to respectively apply one number-selecting voltage from each means to each of said terminals, the number-selecting voltages so applied to any one of said terminals being all in the same phase when all said devices are in the states representing the binary values of the respective digits of the one of said numbers having the same decimal value as that represented by such one terminal, an auxiliary bistate device, said auxiliary bistate device being adapted to be set in a first state when said group of binary numbers are expressed in one of said two binary codes and in a second state when said group of binary numbers are expressed in the other of said codes, means for applying said phase reference alternating current voltage to said auxiliary device, auxiliary voltage-transferring means connected to said auxiliary device and adapted to produce a code-selecting alternating voltage which is in phase with said reference voltage when said auxiliary device is in its first state and of opposite phase from said reference voltage when said auxiliary device is in its second state, and a plurality of auxiliary impedances for connecting said auxiliary voltage-transferring means to those of said display terminals which represent the decimal values of numbers which are the same in one of said binary codes as any number in said group of numbers is in the other of said binary codes.

6. A matrix translator for deriving the decimal value of any number in a group of binary numbers of which those which are positive are expressed in a true binary code having a fixed number of significant digits plus a sign digit having a first binary value and those which are negative are expressed in a predetermined complementary binary code having the same number of significan digits as positive numbers plus a sign digit of the second binary value, comprising a plurality of first bistate devices for respectively representing the significant digits of numbers in either of said codes, a second bistate device for representing the sign digit in either of said codes, each of said devices being adapted to be individually set in a first state when the digit it represents has one binary value and in a second state when such digit has the other binary value, means for applying a phase reference alternating voltage to all of said devices, a plurality of first voltage-transferring means respectively connected to said first bistate devices, each of said first voltage-transferring means being adapted to produce a pair of phase-opposed number-selecting alternating voltages of which the first voltage in each pair is in phase with said reference voltage when the associated first bistate device is in its first state and is of opposite phase from said reference voltage when the same device is in its second state, a second voltage-transferring means connected to said second device, said second voltage-transferring means being adapted to produce an alternating code-selecting voltage which is in phase with said reference voltage when said second device is in its first state and which is of opposite phase from said reference voltage when said second device is in its second state, a plurality of display terminals for respectively representing the decimal values of all numbers in said group of numbers, a plurality of first impedances for respectively connecting said display terminals to said first voltage-transferring means to apply one number-selecting voltage from each such means to each of said terminals, the number-selecting voltages so applied to any one of said terminals being all in the same phase when all of said first bistate devices are in the states representing the binary values of the respective significant digits of the one of said numbers having the same decimal value as that represented by such one terminal, and a plurality of second impedances for connecting said second voltage-transferring means to those of said display terminals which represent the decimal values of numbers which are the same in true binary code as any number in said group of numbers is in said predetermined complementary binary code.

7. The translator of claim 6, further comprising a plurality of output means for respectively representing the decimal values of all numbers in said group of numbers, and switching means for respectively associating each of said output means with the display terminal representing the same decimal value as that to which such output means corresponds when the sign digit has said first binary value and with the display terminal representing a decimal value one unit smaller when the sign digit has said second binary value.

8. The translator of claim 7, wherein said switching means comprise sign digit responsive means, said sign digit responsive means being constructed and arranged to so respond to the sign digit of each of said numbers that it assumes a first condition when that digit has said first binary value and assumes a second condition when that digit has said second binary value.

9. A matrix translator for obtaining the translated equivalents of numbers expressed in any of a variety of digital codes having a fixed number of binary-valued digits, comprising a plurality of bistate devices, a source of phase reference alternating voltage connected to said devices, said devices being constructed and arranged to produce a plurality of pairs of phase-opposed alternating output voltages of which the phases of the voltages in each pair relative to said reference voltage represent the binary value of one of the digits in said codes, a plurality of display terminals respectively corresponding to the translated equivalents of all numbers to be translated, means for connecting said devices with said display terminals to respectively apply one output voltage of each of said devices to each of said terminals, the output voltages so applied to any one of said terminals being all in the same phase when all said devices are in the states representing the digits of the one of said numbers having the translated equivalent corresponding to such one display terminal, an additional bistate device connected to said source of phase reference alternating voltage, said additional bistate device being constructed and arranged to produce an additional alternating output voltage the phase of which relative to said reference voltage represents a particular one of said variety of codes, and additional means for connecting said additional device with pairs of said display terminals which correspond to the translated equivalents of pairs of numbers of which the successive digits of one number in the pair have binary values which are mutually opposite to those of the other number in the pair.

10. A matrix translator for deriving the value in an output code of any number in a group of input numbers expressed in an input code selected from a group of binary digital codes each of which comprises the same number of digits, comprising an alternating current source, a plurality of transformers each having a primary and secondary winding, each of said secondary windings having two output terminals and a grounded reference terminal, a plurality of switching means adapted to be set in either of two mutually reversed states respectively representing the binary values of respective digits in said input code, means connecting said switching means between said source and respective ones of said primary windings, a plurality of display terminals respectively corresponding to the output code values of said input numbers, impedance means for connecting each of said display terminals to one of the output terminals of each of said secondary windings, the output terminals to which any one display terminal is so connected being those at which are produced voltages which are all in the same phase when said switching means are set in the states representing the binary values of the successive digits of the one of said input numbers having the same value as that to which such one display terminal corresponds, an auxiliary transformer having a primary winding and a secondary winding which has a pair of terminals of which one is grounded, auxiliary switching means adapted to be set in either of two states dependent on the type of digital code in which said input numbers are expressed, means connecting said auxiliary switching means between said source and the primary winding of said auxiliary transformer, and auxiliary impedance means for connecting the ungrounded terminal of the secondary winding of said auxiliary transformer to those of said display terminals which are simultaneously connected to transformer output terminals at which are produced voltages which are all in the same phase for any one of said input numbers.

References Cited in the file of this patent

UNITED STATES PATENTS

| | | |
|---|---|---|
| 2,656,524 | Gridley | Oct. 20, 1953 |
| 2,734,182 | Rajchman | Feb. 7, 1956 |